United States Patent [19]
Mason

[11] 3,971,041
[45] July 20, 1976

[54] CHART RECORDER USING A FIXED THERMAL PRINT HEAD

[75] Inventor: Charles F. Mason, Indianapolis, Ind.

[73] Assignee: Esterline Corporation, New York, N.Y.

[22] Filed: Nov. 13, 1974

[21] Appl. No.: 523,269

Related U.S. Application Data

[63] Continuation of Ser. No. 403,249, Oct. 3, 1973, abandoned.

[52] U.S. Cl. ............................... 346/76 R; 346/61
[51] Int. Cl.² ................... G01D 9/34; G01D 15/10
[58] Field of Search ............... 346/76 R, 34, 35, 49, 346/50, 23, 61, 139 C

[56]  References Cited
UNITED STATES PATENTS

| | | | |
|---|---|---|---|
| 3,081,458 | 3/1963 | Lee | 346/45 |
| 3,161,457 | 12/1964 | Schroeder | 346/76 R |
| 3,163,489 | 12/1964 | Borne | 346/76 R |
| 3,453,647 | 7/1969 | Bernstein | 346/76 R |
| 3,465,360 | 9/1969 | Hackley | 346/34 |
| 3,476,877 | 11/1969 | Perkins | 346/76 R X |
| 3,496,333 | 2/1970 | Alexander | 219/216 |
| 3,644,931 | 2/1972 | Stringer | 346/139 X |
| 3,754,279 | 8/1973 | Valenti | 346/76 R |
| 3,815,144 | 6/1974 | Aiken | 346/76 R X |
| 3,840,878 | 10/1974 | Houston | 346/76 R X |

Primary Examiner—Joseph W. Hartary
Attorney, Agent, or Firm—Woodard, Weikart, Emhardt & Naughton

[57] ABSTRACT

A chart recorder for graphically displaying data utilizing a strip of heat-sensitive paper and a row of heat-generating dots. The strip of heat-sensitive paper is advanced across the row of heat-generating dots, and the dots are selectively energized in response to data to be displayed by the chart recorder. The position of an energized dot along the row of dots corresponds to a value of data.

3 Claims, 6 Drawing Figures

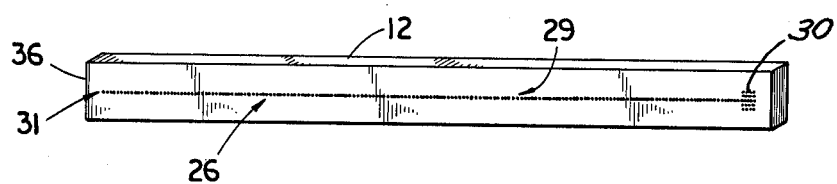
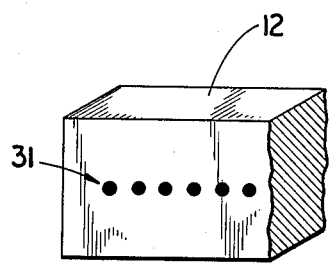
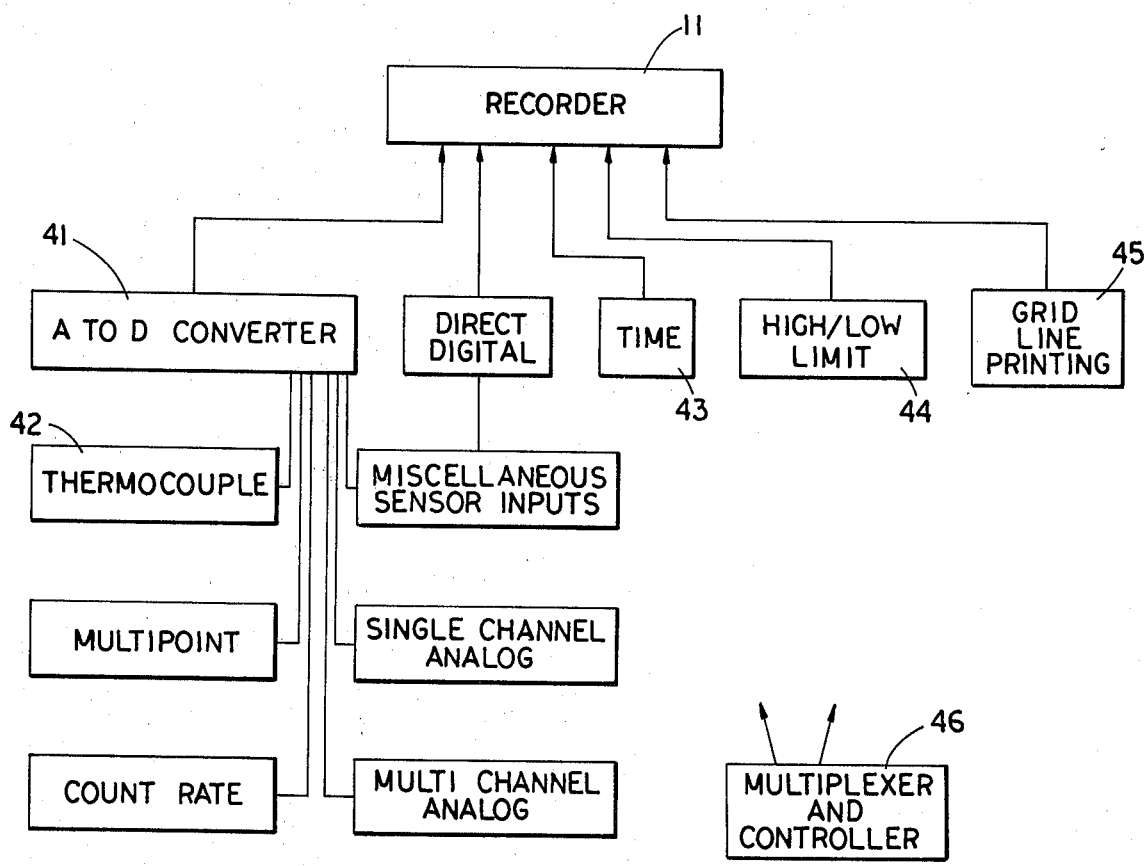

CHART RECORDER USING A FIXED THERMAL PRINT HEAD

CROSS-REFERENCE TO RELATED APPLICATIONS

This is a continuation of application Ser. No. 403,249 filed Oct. 3, 1973 now abandoned.

BACKGROUND OF THE INVENTION

1. Field of the Invention

The invention is in the field of recorders utilizing pyrographic and thermo-chemical processes.

2. Description of the Prior Art

Strip chart recorders have traditionally employed a strip of chart paper moving past an ink pen. The position of the pen on the paper corresponds to the value of data being graphed on the chart paper. The ink pen and the mechanism positioning the pen on the chart paper provide an analog display of the data, and mechanical parts required for an analog presentation such as this inherently present calibration and accuracy problems and have a susceptibility to vibration or shock.

There are also chart recording systems in which paper having a dielectric coating is passed over a stationary recording head which includes etched styluses. The styluses are pulsed selectively by digital circuitry forming a series of dots on the coded paper. Systems such as this are expensive and often require further processing of the paper after the action of the styluses thereon.

Thermal printers wherein heat-sensitive paper is marked by heat-generating elements acting on the paper have been used for printing out digits, letters of the alphabet, etc. These devices have been utilized to replace traditional typewriters at computer terminals and in other functions requiring rapid printing of characters. Examples of this type of device may be found in U.S. Pat. Nos. 3,163,489 to Borne et al., 3,139,026 to Mechstroth et al., 3,596,055 to Elston, 3,501,615 to Merryman et al., 3,340,381 to Best, 3,496,333 to Alexander et al., 3,515,850 to Cady, 3,161,457 to Schroeder et al., 3,495,070 to Zissen, 3,312,979 to Torre et al., 3,409,902 to Merryman, and 3,578,946 to Colello.

SUMMARY OF THE INVENTION

An embodiment of the present invention is a chart recorder for graphically displaying data comprising a chassis, a member attached to the chassis having a row of heat-generating dots along its surface, drive means for advancing a strip of heat-sensitive paper across the row of dots, and logic means having an input and having an output coupled to the row of dots for selectively energizing dots in the row of dots in response to data to be displayed, the position of an energized dot along the row of dots corresponding to a value of data.

It is an object of the present invention to provide a chart recorder digital in operation having a display which appears in an analog format.

It is a futher object of the present invention to provide a chart recorder utilizing a fixed printing head and heat-sensitive paper.

Further objects and advantages of the present invention shall become apparent from the following detailed description.

BRIEF DESCRIPTION OF THE DRAWINGS

FIG. 4 is an enlarged perspective view of the print head shown in FIG. 2.

FIG. 5 is an enlarged view of an end of the print head of FIG. 4.

FIG. 6 is a block diagram illustrating various inputs for the chart recorder of FIG. 1.

DESCRIPTION OF THE PREFERRED EMBODIMENT

Figure 1:
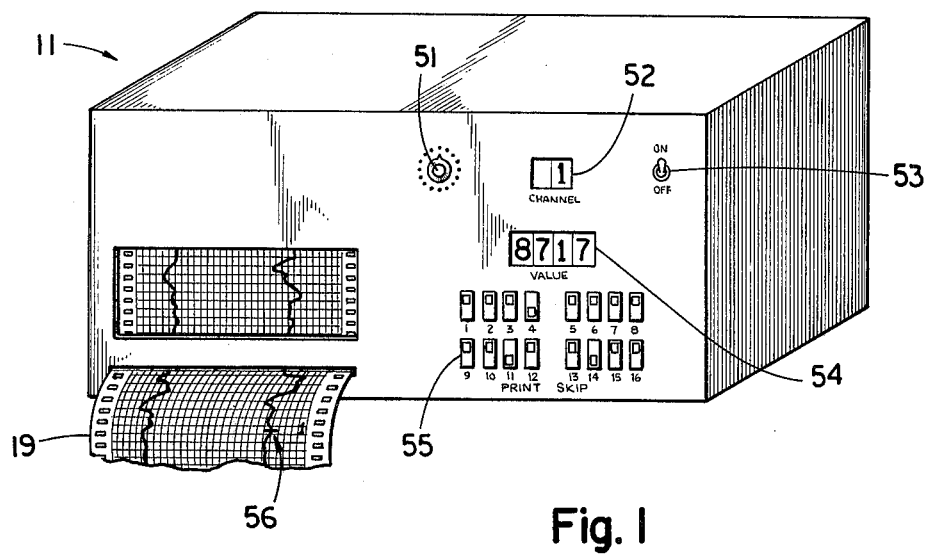
FIG. 1 is a perspective view of a chart recorder embodying the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
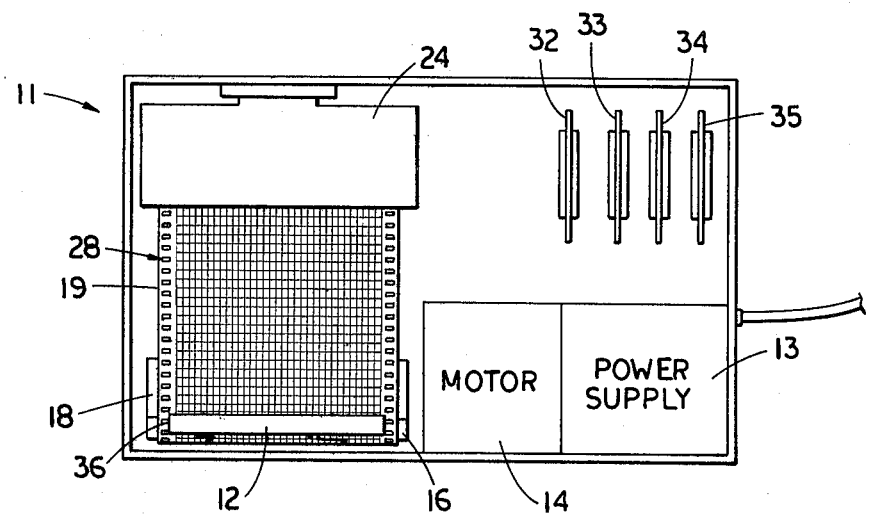
FIG. 2 is a top plan view of the recorder of FIG. 1 with the top removed.
Figure 3:
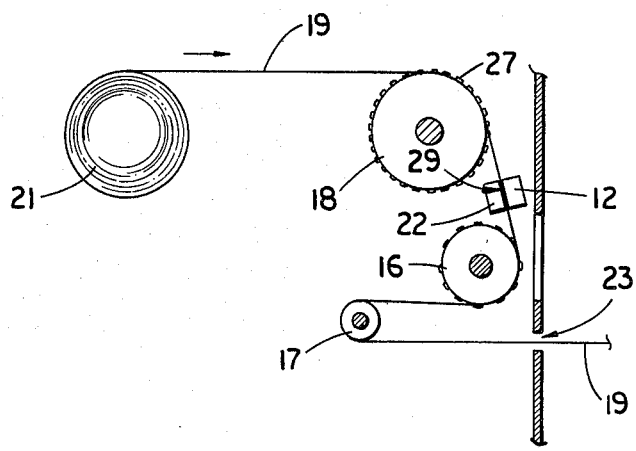
FIG. 3 is a diagrammatic view of the chart recorder of FIGS. 1 and 2.

Referring in particular to FIGS. 1, 2 and 3, there is shown a chart recorder, generally indicated as 11, having a fixed print head 12. Power supply 13 (FIG. 2), which may be derived from either an external power source or internal batteries, energizes motor 14 (FIG. 2) which turns drive roller 16 and rollers 17 and 18.

Standard thermal printing paper 19, such as is available from Minnesota Mining and Manufacturing Company and National Cash Register, is unrolled from paper roll 21 and moved around roller 18, between print head 12 and pressure pad 22, around roller 16 and around roller 17 to be fed out of the recorder through slot 23. Heat-sensitive paper roll 21 is located beneath logic board 24 (FIG. 2). The heat-sensitive paper 19, after moving around roller 18, is held in contact along its entire width against print head 12 by pressure pad 22 so that the paper moves adjacent the row of heat-generating dots, generally indicated as 26 (FIG. 4), ensuring that energization of dots in row 26 will mark paper 19. The sequential energization of dots as paper 19 advances across row of dots 26 produces curves on paper 19 corresponding to the values of input data. Teeth such as 27 on rollers 18 and 16 engage holes such as 28 along the edges of paper 19 in order to move paper 19 smoothly between pressure pads 22 and print head 12.

Print head 12, as shown in FIG. 4, contains a row 26 of heat-generating dots along face 29, which makes contact with paper 19. There are 400 heat-generating dots disposed along row 26 on face 29 of print head 12, so that if the entire row 26 is being used for a scale, the accuracy obtained is one quarter of 1%. In FIG. 5, dots such as 31 are shown along an enlarged portion of print head 12.

Plug-in logic boards 24, 32, 33, 34 and 35 are provided for selectively energizing dots such as 31 in the row of dots 26 in response to input data to be graphically displayed on paper 19. The position of an energized dot along the row of dots 26 corresponds to a value of data. For example, dot 31 at end 36 of print head 12 might correspond to a zero value of the input data with increasing values of data being displayed by the energization of dots progressively further away from end 36 of print head 12 along row 26 of dots. Logic cards 24 and 32, 33, 34 and 35 are replaceable with other logic cards in order to appropriately convert input data to the desired selection of dots on print head 12 to be energized.

For example, there are shown in FIG. 6 several possible arrangements of inputs to recorder 11. As shown in FIG. 6, various analog signal sources may be coupled to an analog to digital converter 41, which then serves as an input to the recorder logic boards. The digital information from the converter 41 is then decoded and converted so that the proper dots along row 26 on print head 12 are energized, thereby graphically representing the data on heat-sensitive paper 19. For example, thermocouple 42 may measure the temperature at a test point continuously and have its output coupled through analog to digital converter 41 to recorder 11, wherein the temperature is graphically displayed. Since recorder 11, with its 400 discrete heat-generating dots, is a digital apparatus, it will also readily accept direct digital data, such as from a digital computer, which data is then properly decoded by logic circuitry on boards 32, 33, 34, 35 and 24 to energize the appropriate dots on print head 12. As also shown in FIG. 6, other parameters may be displayed simultaneously with the incoming data. Time markers may be generated by time marker generator 43, high and low limit indications may be displayed graphically from generator 44 or grid lines may be produced by generator 45.

It can be seen also that multi-channel graphic displays are produced either through the use of multi-channel inputs which are assigned portions of the row of dots on print head 12 within the recorder or by providing a multiplexer, such as is generally indicated at 46 in FIG. 6, to accommodate a plurality of input data signals.

Motor 14 is controlled by the logic cards of the recorder to turn rollers 16, 17 and 18 at a speed appropriate for the time base of the input data signal. Motor 14 may also be externally controlled, and is capable of a stepped drive for digital control. The recorder could be run at extremely slow speeds to conserve paper, and even though the printing is of the thermal type, the logic circuitry would insure that there would be no line widening due to excessive heat. The recorder could also record at a fairly high rate of speed when required. The recorder generates very little radio frequency interference and makes almost no noise, even in the multipoint configuration.

Although the recorder is digital in operation, and thus very compatible with computer and digital data gathering techniques, the display appears in an analog format familiar to users of paper chart recorders. The recorder requires little power and operates at low voltages so that it is easily used in portable applications under battery power for extended periods of time. Since the recorder is a solid state unit, it should have a long service free life, and since only the paper moves, it would not be susceptible to problems of vibration and shock.

Print head 12 comprises a row of monolithic heat-generating dots or semiconductor heat chips. Part of the logic means for selecting the proper dot to be energized is located on print head 12 in the form of integrated circuitry.

The recorder 11 includes several front-panel controls including off-on toggle switch 53 for activating power supply 13. The circuitry for multiplexer 46 (FIG. 6) is contained on board 24 (FIG. 2) and provides 16 channel capability. The value of data for the channel selected by switch 51 is shown in a digital readout through window 54. The channel selected may be displayed at window 52. A plurality of slide switches such as 55 is provided for choosing which of the 16 channels available are to be displayed by recorder 11 on paper 19.

A portion of the dots at one end of dot row 26 are used to indicate which plot on paper 19 corresponds to each channel being printed. This portion of dots provides a binary or digital display of the channel number while simultaneously one or two dots on either side of the data point for the curve of that channel are energized, forming a small transverse line through the curve, as shown at 56 (FIG. 1). A digital display of the channel number may be formed by a 4 × 5 dot matrix 30 at an end of row 26 (FIG. 4).

While there have been described above the principles of this invention in connection with specific apparatus, it is to be clearly understood that this description is made only by way of example and not as a limitation in the scope of the invention.

The invention claimed is:

1. A chart recorder for graphically displaying data comprising:
    a chassis;
    a print head mounted on the chassis and having a single row of heat-generating dots along a first face, the first face including an array of heat-generating dots adjacent the row of dots, the dimensions of the array of heat-generating dots being significantly less than the length of the row of heat-generating dots;
    a strip of heat sensitive medium;
    drive means for advancing the strip of heat sensitive medium across the row of dots and the array of dots, the heat sensitive medium advanced past the print head being marked by dots in the row of heat generating dots to produce graphical representations and by the array of dots to produce a symbolic character.

2. The recorder of claim 1 in which the heat sensitive medium advanced past the row of dots is marked by a small transverse line through one of the graphs corresponding to the symbolic character.

3. The recorder of claim 1 in which there are about 400 dots in the row of heat generating dots.

* * * * *